UNITED STATES PATENT OFFICE.

WILLIAM QUANN, OF PHILADELPHIA, PENNSYLVANIA, ASSIGNOR TO HIMSELF, WM. N. TAYLOR, A. R. WETMORE, AND CHARLES C. LATHROP.

IMPROVEMENT IN SMELTING ORES OF GOLD, SILVER, COPPER, &c.

Specification forming part of Letters Patent No. 37,198, dated December 16, 1862.

*To all whom it may concern:*

Be it known that I, WILLIAM QUANN, of the city of Philadelphia, county of Philadelphia, and State of Pennsylvania, have invented a new and Improved Process of Smelting the Ores of Gold, Silver, Nickel, Copper, and all metals other than iron, and for purifying the metals thus obtained; and I do hereby declare that the following is a full and exact description thereof.

The important and difficult processes of smelting the ores of gold, silver, nickel, copper, and all metals other than iron, and of purifying the metals obtained therefrom, I perform in a properly-constructed furnace by a mixture, in proportions as will be hereinafter stated, of pulverized wood charcoal, bone-dust, or animal charcoal produced by the calcination of the hard portions of animals, common salt, ammoniacal salts, wood-ashes, siliceous sand, and fixed oil or resinous matter, to which mixture sometimes, and under circumstances to be hereinafter mentioned, I add sulphur in the form of powder or the sulphuret of a metal. The aforesaid ores frequently consist not only of one of the metals mineralized by means of the metalloids—as, for example, arsenic, carbon, oxygen, chlorine, phosphorus, or sulphur—but of alloys of one of the metals with one or more of the others, so that the reduction of the ores and the separation of the metals may require the use of all of the constituents of the above mixture or of but a portion of them. To the peculiar properties of these constituents and to their combined effects when mixed, as well as to my methods of application, I ascribe their efficacy in the furnace processes. This will be better understood when it is remembered that a portion of the aforesaid impurities are volatile and must be driven off in the state of vapor, while others again are fixed and are to be fluxed or made to separate themselves in the liquid state. My mixture fulfills both of these conditions, being itself composed partly of fluid and partly of volatile ingredients. The latter aid in removing the vaporizable impurities under the action of the furnace by combining or mixing with them, thus rendering them more volatile and accelerating their elimination and their passage into and up the chimney or stack. This is especially true of the ammoniacal salts, the thorough intermixture of which with the broken ore I further secure by soaking it in the solution of the salts for twelve hours before smelting. These salts are aided in their action at the high temperature employed by the common salt, a portion of which is sublimed either alone or in combination. The base of the common salt, which is soda, will moreover combine with the quartzose or other stony materials which accompany the ore, and in that manner act as a flux in connection with the wood-ashes, the base of which is the other fixed alkali potash.

To accomplish the reduction of the ore by means of the agent carbon, I present it in no less than three different forms, viz: fixed oil or resinous matter, pulverized charcoal, and animal black produced by the calcination of bone or other hard parts of animals. The first named of the three, being charred in the furnace-fire, yields carbon in the best form possible for effecting the reduction of metals, while the last named or animal-black is not only an excellent form of carbon, but it is composed in great part of bone phosphate of lime, the remarkable efficacy of which in the separation and purification of the metals at high temperature I have abundantly proved. When the slag or scoria does not flow kindly in consequence of the absence of the requisite amount of silica in the earthy components of the ore I add sand in sufficient quantity to make a readily-fusible slag, and thus facilitate the separation of the fixed impurities. Sand is also useful mechanically in excluding atmospheric oxygen. Finally, when iron is one of the impurities, as is not unfrequently the case in ores of copper and kindred metals, I employ powdered sulphur, flowers of brimstone, or a sulphuret which will yield sulphur, by which the ferruginous matter may be removed in the form of sulphuret of iron.

For fluxing ores—such as gold, silver, copper, nickel, and all metals other than iron—I employ the following combination per ton, smelting by the action of heat, viz: two quarts of wood-ashes, more or less; two pounds of chemical charcoal, more or less; three and a half pounds carbonate ammonia in solution; one quart of oil or other resinous matter; one quart of salt in solution; eight ounces of bone-dust or charred bone-dust glue abstracted; four ounces of pulverized sulphur, and one bushel of common sand, all the above ingredients to be used in greater or less proportions, according to the quality of the quartz or ores used, the quartz or ores to lie in solution of ammonia twelve hours before smelting, the above combination forming the most powerful volatile flux with which I am acquainted for smelting quartz or ores by the action of heat.

Having thus described my invention, what I claim as new, and desire to secure by Letters Patent of the United States, is—

In the process of smelting gold, silver, copper, nickel, and all other ores except iron, and for purifying the metal obtained therefrom, the use of wood-ashes, chemical charcoal, carbonate of ammonia, oil, or other resinous matter, salt, bone-dust, sulphur, and sand, substantially as described.

Witness my hand this 18th day of October, 1862, in the matter of my application for patent on new process for treating and separating the ores of gold, silver, copper, nickel, and other similar metals.

WILLIAM QUANN.

Witnesses:
 WILLM FREELAND,
 JAS. BRUTSCHE.